US012794615B2

(12) United States Patent
Polaganga et al.

(10) Patent No.: US 12,794,615 B2
(45) Date of Patent: Nov. 10, 2026

(54) PRIMARY CELL CHANGE IN UPLINK NEW RADIO CARRIER AGGREGATION SCENARIOS

(71) Applicant: T-MOBILE INNOVATIONS LLC, Overland Park, KS (US)

(72) Inventors: Roopesh Kumar Polaganga, Bothell, WA (US); Amembal Vikram Pai, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 569 days.

(21) Appl. No.: 18/295,194

(22) Filed: Apr. 3, 2023

(65) Prior Publication Data

US 2024/0333443 A1 Oct. 3, 2024

(51) Int. Cl.
*H04L 5/00* (2006.01)
*H04L 5/14* (2006.01)

(52) U.S. Cl.
CPC .......... *H04L 5/0035* (2013.01); *H04L 5/0055* (2013.01); *H04L 5/14* (2013.01)

(58) Field of Classification Search
CPC .................................................... H04L 5/0035
See application file for complete search history.

(56) References Cited

U.S. PATENT DOCUMENTS 7,339,898 B2 * 3/2008 Lee ........................ H04L 1/0017 370/465
8,891,402 B2 * 11/2014 Yin ......................... H04L 5/001 370/254
9,237,566 B2 * 1/2016 Park ....................... H04L 1/1812
9,258,741 B2 * 2/2016 Wang ..................... H04L 1/1614
9,819,433 B2 * 11/2017 Yi ......................... H04B 7/2656
9,820,237 B2 * 11/2017 Yang .................... H04W 52/281
10,939,470 B2 * 3/2021 Hosseini ............... H04L 1/1671
11,621,817 B2 * 4/2023 Bala ...................... H04L 1/0026 370/329
2014/0064159 A1 * 3/2014 Larsson ................ H04W 72/20 370/280
2015/0063179 A1 * 3/2015 Yang ......................... H04L 5/14 370/280
2016/0119084 A1 * 4/2016 Wang .................... H04L 1/1614 370/329
2019/0246432 A1 * 8/2019 Hosseini ............... H04L 1/1671
2020/0245343 A1 * 7/2020 Kim ....................... H04W 76/16
2020/0259621 A1 * 8/2020 Oh ......................... H04L 1/1822
2022/0312414 A1 * 9/2022 Kumar .................. H04L 5/0055

* cited by examiner

*Primary Examiner* — Guang W Li
(74) *Attorney, Agent, or Firm* — SHOOK, HARDY & BACON L.L.P.

(57) ABSTRACT

A method for primary cell change in an uplink NRCA scenario is provided. An uplink NRCA is configured and active for a UE on a primary serving cell when a NACK rate of the primary serving cell uplink is compared with a predetermined NACK rate threshold for defined TTI slots. The NACK rate of the primary serving cell uplink is compared with the NACK rate of at least one secondary cell uplink for the TTI slots. An effective uplink bandwidth of the primary serving cell is compared with an effective uplink bandwidth of the at least one secondary cell. When the difference between the effective uplink bandwidths is less than a predetermined effective bandwidth difference threshold, the UE is instructed to change from the primary serving cell to the at least one secondary cell.

12 Claims, 7 Drawing Sheets

PRIMARY CELL CHANGE IN UPLINK NEW RADIO CARRIER AGGREGATION SCENARIOS

BACKGROUND

The growth of 5G wireless communications has brought more users to 5G networks and gives users faster, more reliable, and more capable telecommunications services. 5G carrier aggregation offers a significant performance improvement to network customers. Carrier aggregation is a software functionality that allows network operators to combine the capabilities of cells at different frequency allocations to enhance the end user experience. Each frequency layer, known as a carrier, has specific coverage in terms of range and capacity, such as bandwidth and data rate. Carriers in higher frequency ranges may provide greater capacity while carriers in the lower range provide wider or deeper coverage. Coverage is typically limited by uplink, not downlink. A stable connection needs both uplink and downlink. Using carrier aggregation allows use of downlink for all aggregated cells, while providing connection stability through a common uplink on the lower aggregated carrier.

The primary cell is where the user equipment (UE) makes the initial connection to the network and establishes both uplink and downlink for signaling and data. Secondary cells may be added on both uplink and downlink using new radio carrier aggregation (NRCA). These secondary cells carry only data, not signaling. Both uplink NRCA and downlink NRCA may exist simultaneously with the uplink NRCA carrier combination being used the same as or a subset of the downlink NRCA combination in use.

The uplink may be the limiting factor due to the power limitations of the UE. These power limitations may dictate that a change of primary cell occur. A UE may have a primary cell that will soon need to change and at the same time have an active secondary cell. The primary cell will need to change when uplink congestion is encountered. When the primary cell needs to be changed the user may experience poor performance and call disruption, both of which annoy users. At present, the primary cell is changed to a new primary cell, causing further disruption, even though there is an active secondary cell in use.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for primary cell change in uplink NRCA scenarios are provided. A dynamic change of primary cell change in an uplink NRCA scenario begins with determining if uplink NRCA is configured and active for at least one UE using a primary serving cell. The negative acknowledgement (NACK) rate of the at least one UE for the uplink using the primary serving cell is then determined and compared with a predetermined NACK rate threshold for defined transmission time interval (TTI) slots. The uplink NACK rate may be based on a percentage of uplink slots in an overall bandwidth. The uplink NRCA may use time division duplexing (TDD) and may use the same frequency combinations as the downlink NRCA.

When the NACK rate is higher than the predetermined NACK rate threshold for the defined TTI slots, the NACK rate for the primary serving cell may be compared with the NACK rate of at least one secondary cell. If the at least one secondary cell has a lower NACK rate than the serving primary cell further comparison with an effective uplink bandwidth may be performed. The comparison is made between the effective uplink bandwidth of the primary serving cell and the effective uplink bandwidth of the at least one secondary cell. The difference between the effective uplink bandwidth for the primary serving cell and the effective uplink bandwidth of the at least one secondary cell may then be compared with a predetermined effective bandwidth difference threshold. When the difference between the effective uplink bandwidth of the primary serving cell and the effective uplink bandwidth of the at least one secondary cell is less than the predetermined effective bandwidth difference threshold, the UE is instructed to change from the primary serving cell to the at least one secondary serving cell.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
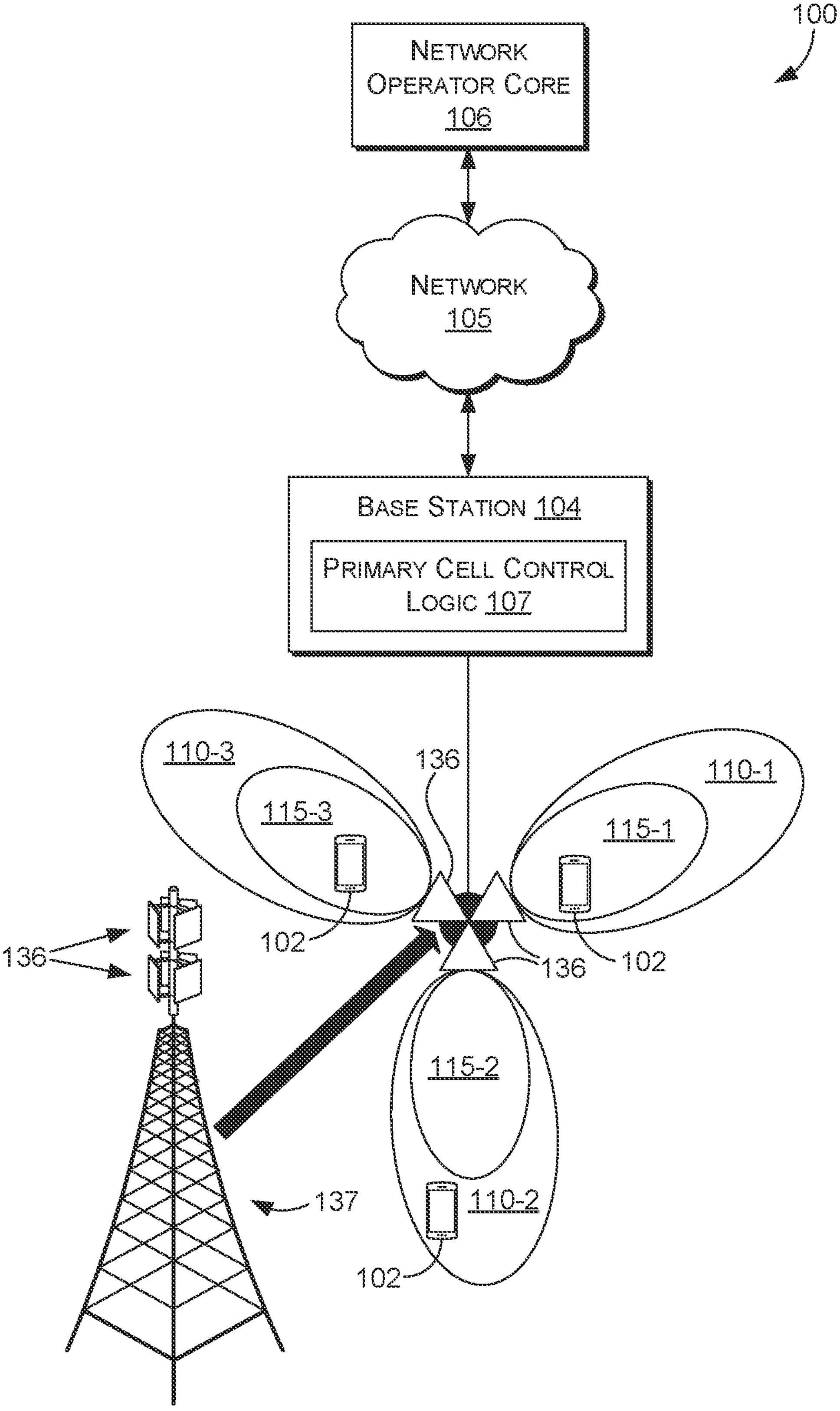
FIGS. 1 and 1A are diagrams illustrating an example network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
DL Downlink
eNodeB Evolved Node B
FDD Frequency Division Duplex
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
ML Machine Learning
NRCA New Radio Carrier Aggregation
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Signal Received Power
RSRQ Reference Signal Received Quality
RSSI Received Signal Strength Indicator
SINR Signal-to-Interference-Plus-Noise Ratio
SNR Signal-to-Noise Ratio
SON Self-Organizing Networks
TDMA Time Division Multiple Access
TDD Time Division Duplex
TXRU Transceiver (or Transceiver Unit)
UE User Equipment
UL Uplink
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 32nd Edition (2022).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers) to provide network coverage. The base stations are employed to broadcast and transmit transmissions to user devices of the telecommunications network. A base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 600 described herein with respect to FIG. 6.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In aspects, a UE provides UE data including location and channel quality information to the wireless communication network via the base station. Location information may be based on a current or last known position utilizing GPS or other satellite location services, terrestrial triangulation, an base station's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the base station or at the individual antenna array of the base station. In other aspects, the processing of said information may be done remotely.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

In accordance with a first aspect of the present disclosure a method for primary cell change in an uplink NRCA scenario is provided. The method begins with determining that uplink NRCA is configured and active for at least one UE on a primary serving cell. If the at least one UE has uplink NRCA configured and active a determination is then made that a NACK rate of the primary serving cell uplink is higher than a predetermined NACK rate threshold for defined TTI slots. When the NACK rate is higher than the predetermined NACK rate threshold, the NACK rate of the primary serving cell uplink is then compared with a NACK rate of at least one secondary cell uplink for the defined TTI slots. When the NACK rate of the at least one secondary cell uplink is lower than the NACK rate for the primary serving cell then an effective uplink bandwidth is compared. The effective uplink bandwidth of the at least one secondary cell is compared with an effective uplink bandwidth of the primary serving cell. The difference between the effective uplink bandwidths is then compared with a predetermined effective bandwidth difference threshold. When the difference is less than the predetermined effective bandwidth difference threshold then the UE is instructed to change from the primary serving cell to the at least one secondary cell.

A second aspect of the present disclosure provides a method for primary cell change in an uplink NRCA scenario is provided. The method begins when a UE transmits an uplink message containing information on uplink NRCA configuration and activity for the UE to a primary serving cell. The uplink message may also contain NACK rate for a primary serving cell of the UE. The UE may receive an instruction from the primary serving cell to change uplink NRCA activity from the primary serving cell to at least one designated secondary cell.

Another aspect of the present disclosure is directed to a non-transitory computer storage media storing computer-useable instructions that, when used by one or more processors, cause the processors to determine that uplink NRCA is configured and active for at least one UE on a primary serving cell. Based on the determination, a NACK rate of the primary serving cell uplink is compared with a predetermined threshold for defined TTI slots and when the NACK rate is higher than the predetermined NACK rate threshold a further comparison is made. The NACK rate of the primary serving cell uplink is compared with the NACK rate of the at least one secondary cell uplink for the defined TTI slots. The effective uplink bandwidth of the primary serving cell is then compared with the effective uplink bandwidth of the at least one secondary cell. When the difference between the effective uplink bandwidths is less than a predetermined effective bandwidth difference threshold then an instruction is sent to the at least one UE to change from the primary serving cell to the at least one secondary cell.

Carrier Aggregation (CA) is a provision of 5G and LTE standards that enables wireless operators to combine distinct carrier channels from a primary serving cell (P-cell) and at least one secondary serving cell (S-cell) into a single data channel to obtain higher data rates with mobile user equipment (UE). In general, for a UE to benefit from carrier aggregation, the UE is located within an overlapped area of cell boundaries that includes coverage from a primary serving cell operating via a primary component carrier (e.g. at carrier frequency, $f_1$), and a secondary serving cell operating via a second component carrier (e.g. at carrier frequency, $f_2$). The primary component carrier and second component carrier can either be within the same frequency band (e.g., both carriers in band N41) or within different frequency bands (e.g., one carrier in band N41 and the other in band N71). It should also be understood that primary component carrier and second component carrier can both implement the same duplexing scheme (e.g., both frequency division duplexing (FDD) and time division duplexing (TDD)), or different duplexing schemes (e.g., a combination of FDD and TDD).

The use of carrier aggregation improves data rates for UE by increasing the overall bandwidth of the logical channel available to the UE to send and/or receive data to the network operator core. At present, downlink NRCA is being used to provide high downlink speeds to 5G users. With technology evolution, uplink NRCA is being introduced to provide high uplink speeds. Initially, only certain uplink NRCA frequency combinations will be supported, however, subsequent chipsets and devices will support more frequency combinations to accommodate more operators and their spectrum holdings. The uplink NRCA frequency combinations are preferably a subset of the downlink NRCA frequency combinations to be supported by the device for standardization and implementation feasibility. The uplink NRCA frequency combinations may also be the same as the downlink frequency combinations. Careful consideration of frequency combinations is needed to ensure primary and secondary cells are available for UEs among the available candidate layers.

FIG. 1 is a diagram illustrating an example network environment 100 embodiment in which aspects of primary cell change in uplink NRCA scenarios, including primary cell control logic may be implemented. Network environment 100 is but one example of a suitable network environment and is not intended to suggest any limitation as to the scope of use or functionality of the embodiments disclosed herein. Neither should the network environment 100 be interpreted as having any dependency or requirement relating to any one or combination of components illustrated.

As shown in FIG. 1, network environment 100 comprises a network operator core 106 that provides one or more wireless network services to one or more UEs 102 via a base station 104, often referred to as a radio access network (RAN). In the context of fourth generation (4G) Longer Term Evolution (LTE), the base station 104 may be referred to as an eNodeB, or eNB. In the context of fifth generation (5G) New Radio (NR), the base station 104 may be referred to as a gNodeB, or gNB. Other terminology may also be used depending on the specific implementation technology. In particular, each UE 102 communicates with the network operator core 106 via the base station 104 over one or both of uplink (UL) radio frequency (RF) signals and downlink (DL) RF signals. The base station 104 may be coupled to the network operator core 106 by a backhaul network 105 that comprises wired and/or wireless network connections that may include wireless relays and/or repeaters. In some embodiments, the base station 104 is coupled to the network operator core 106 at least in part by the Internet or other public network infrastructure. The network environment 100 is configured for wirelessly connecting UEs, such as UE 102 to other UEs, such as UE 104 via the same base station 104, via other base stations, or via other telecommunication networks such as backhaul network 105 or a publicly-switched telecommunication network (PSTN), for example. Generally, each UE 102 is a device capable of unidirectional or bidirectional communication with radio units (also often referred to as radio points or wireless access points) of the base station 104 using RF waves.

As illustrated in FIG. 1, the base station 104 radiates and receives RF signals via one or more directional antennas 136 that each serve UE 102 that are located within a geographic area referred to as a cell or sector. The specific size, shape and orientation of a cell is a function, at least in part, on the design and azimuth (tilt) of each of the several antennas 136, and the carrier frequency of the carrier serving that cell. In the particular embodiment illustrated in FIG. 1, base station 104 forms six cells (or sectors) each via a respective antenna 136 mounted to a site tower 137. In other embodiments, a few or greater number of cells may be formed.

Cells 110-1, 110-2 and 110-3 operate at a first carrier frequency, $f_1$, and cells 115-1, 115-2 and 115-3 operate at a second carrier frequency, $f_2$. In some embodiments, carrier frequency, $f_1$, is a low-band frequency and carrier frequency, $f_2$, is a high- or mid-band frequency so that cells 115-1, 115-2 and 115-3 each cover relatively smaller geographic areas than cells 110-1, 110-2 and 110-3. In this example, when a UE 102 initializes communications with the base station 104, it is allocated one or more resource blocks available on carrier frequency, $f_1$, so that carrier frequency, $f_1$, is the primary component carrier for that UE 102. Depending on its physical location, one of the cells 110-1, 110-2 and 110-3 therefore serves as the primary serving cell for that UE 102. The cells 115-1, 115-2 and 115-3 operating with the carrier frequency, $f_2$, are each potential secondary serving cells for the secondary component carrier that may be used in combination with cells 110-1, 110-2 and 110-3 to implement carrier aggregation for UE 102.

As previously explained, secondary cell activation for a UE 102 is available when the UE 102 is located within an overlapping region of a primary serving cell and a secondary serving cell, and those primary and secondary serving cells are specifically related to each other by the base station 104 for purposes of carrier aggregation in uplink or downlink.

Figure 1A:
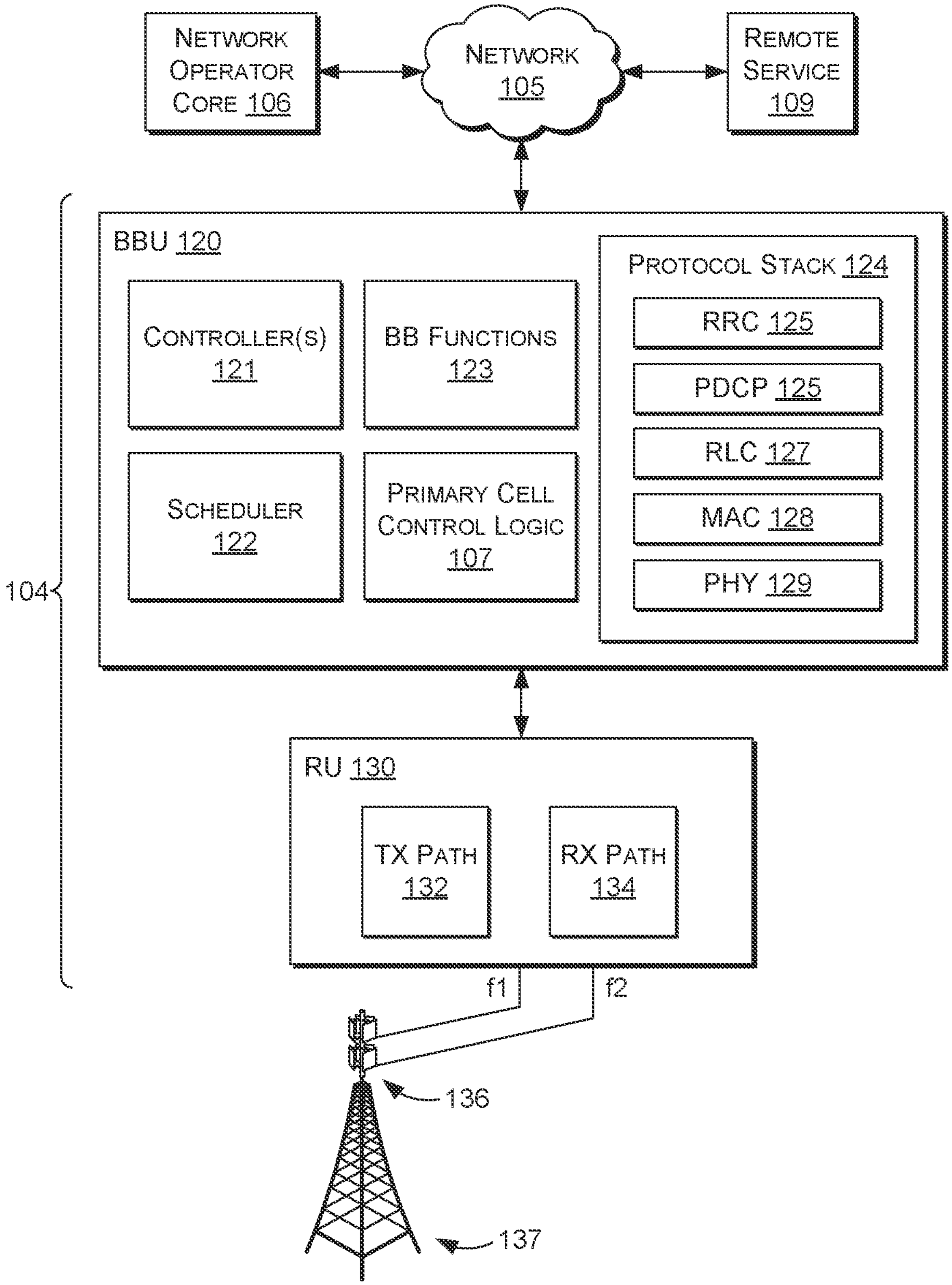

Referring now to FIG. 1A, FIG. 1A illustrates a base station 104 comprising a baseband unit (BBU) 120 coupled to a least one Radio Unit (RU) 130 through which the base station 104 serves a coverage area that comprises the cells 110-1, 110-2 and 110-3 and cells 115-1, 115-2 and 115-3 (shown in FIG. 1). The BBU 120 comprises the circuitry and functionality to implement an air interface and Open System Interconnection (OSI) Layer 1, Layer 2 and Layer 3 functions for the air interface. The RU 130 includes a radio head comprising transmit (TX) path 132 that includes radio transmitter circuitry (such digital-to-analog converters, one or more RF filters, frequency up-converters, and/or a Power Amplifier (PA)) and receive path (RX) 134 that includes radio receiver circuitry (such analog-to-digital converters, one or more RF filters, frequency down converters, and/or a Low Noise Amplifier (LNA)). The TX path 132 and RX path 134 may be coupled to the plurality of antenna 136 by an appropriate coupler (such as a duplexer, for example). The antennas 136 may be physically mounted to a site tower 137 or other structure (such as a building, for example). Downlink RF signals are radiated into the coverage area via TX path 132 and antenna 136 for reception by the UEs 102. Uplink RF signals transmitted by the UEs 102 are received via the antenna 136 and RX path 134. The base station 104 may communicate with the UE 102 using an air interface that supports Single Input Single Output (SISO), or Multiple Input Multiple Output (MIMO), Single Input Multiple Output (SIMO), Multiple Input Single Output (MISO) or other beam forming technologies. In some embodiments, the base station 104 may optionally support multiple air interfaces and/or multiple wireless operators.

The network environment 100 and base station 104 are generally configured for wirelessly connecting UE 102 to data or services that may be accessible on one or more application servers or other functions, nodes, or servers (such as a remote service 109, for example). In some implementations, the remote service 109 serves as the originating server or servers for operating data (such as environmental data, traffic condition data, navigation and/or other operating commands) delivered to the UE 102 and/or utilized for operation of the UE 102.

It should be understood that in some aspects, the network environment 100 shown in FIGS. 1 and 1A may implement one or more features of the network operator core 106 within other portions of the network, or may not implement them at all, depending on various carrier preferences.

As depicted in FIG. 1A, the BBU 120 may comprise one or more controllers 121 comprising a processor coupled to a memory and programed to perform one or more of the functions of the BBU 120 described herein. In some embodiments, the base station functions described herein may be executed by one or more controllers in a distributed manner utilizing one or more network functions orchestrated or otherwise configured to execute utilizing processors and memory of the one or more controllers. For example, where base station 104 comprises a gNodeB, the functions of the BBU 120 may be distributed between functional units comprising a Centralized Unit (CU) and at least one Distributed Unit (DU). As such, one or more functions of the base station described herein may be implemented by discrete physical devices or via virtual network functions.

The BBU 120 is responsible for, among other things, digital baseband signal processing, for example to process uplink and downlink baseband signals, shown in FIG. 1A as Baseband (BB) function(s) 123. The BBU 120 further includes a scheduler 122 through which the BBU 120 allocates resource blocks (RBs) to the UE 102 with respect to both uplink and downlink frames. A RB is the smallest unit of resource in a communication frame that can be allocated to a UE. In some embodiments, one RB is 1 slot long in time, and in frequency comprises a plurality of subcarriers each having a frequency width determined by the applicable air interface standard. For example, for LTE, one resource block is 180 kHz wide in frequency, typically comprising twelve 15 kHz subcarriers. The data carrier within each RB is referred to as the resource element (RE), which comprises 1 subcarrier×1 symbol, and transports a single complex value representing data for a channel. Functions performed by the scheduler 122 include, but are not limited to: Packet Scheduling (arbitration of access to air interface resources between active UEs), resource allocation (allocation of air interface resources, such as resource blocks, to UEs), and power allocations (adjusting transmit power to achieve desired data rates and signal-to-interference noise ratio (SINR) levels).

Uplink and downlink communications traffic between the BBU 120 and UE 102 are processed through a protocol stack 124 implemented by the BBU 120 that comprises various protocol stack layers. In the example embodiment illustrated in FIG. 1A, the protocol stack 124 includes a radio resource control (RRC) layer 125, packet data convergence protocol (PDCP) layer 126, radio link control (RLC) layer 127, medium access control (MAC) layer 128, and physical layer (PHY) 129. In some embodiments, the implementation of carrier aggregation is performed at least in part by the RRC layer 125 and MAC layer 128.

The MAC layer 128 is responsible, for example, for mapping between logical channels of the RLC layer 127 and transport channels of the PHY layer 129. MAC layer 128 may also perform functions such as, but not limited to, multiplexing of MAC service data units (SDUs) from logical channels onto transport blocks (TB) to be delivered to the PHY layer 129 on transport channels, de-multiplexing of MAC SDUs from one or different logical channels from transport blocks (TB) delivered from the PHY layer 129 on transport channels, scheduling information reporting, error correction through hybrid automatic repeat requests (HARQ), priority handling between UEs by means of dynamic scheduling, priority handling between logical channels of one UE, and logical channel prioritization.

In some embodiments, MAC layer 128 manages multiplexing and demultiplexing of data across a primary component carrier and secondary component carriers when carrier activation is activated. For example, MAC layer 128 distributes data from each logical channel across the primary and secondary component carriers of serving cells identified to the MAC layer 128 (by primary cell control logic 107, for example) as related for carrier aggregation purposes. Logical channels, are multiplexed to form transport blocks for each component carrier with each component carrier. When carrier aggregation is activated, a primary component carrier is provided from an antenna 136 to a primary serving cell, and one or more secondary component carriers are provided through one or more other antennas 136 for one or more secondary serving cells, at the same time. A primary serving cell is selected for a UE 102 during cell search by the UE 102 and a UE may be instructed to change to a new primary serving cell by the primary cell control logic 107. In some embodiments, secondary cell coverage is added and activated or deactivated by MAC layer 128 in response to signaling from RRC layer 125. For example, activation and deactivation of secondary component carriers may be managed through MAC control elements sent from the RRC layer 125 to the MAC layer 128. In some embodiments, deactivation of secondary component carriers by the MAC layer 128 may be time based. In some embodiments, the instruction to change to a new primary serving cell may be based on an uplink negative acknowledgement (NACK) rate that is higher than an operator defined threshold for defined transmission time interval.

A NACK is a signal used to indicate that the data transmitted over a network was received with errors or was unreadable. A network operator may define a threshold for NACK rate for a primary serving cell. The NACK rate threshold is selected such that primary serving cells with a higher than desirable NACK rate are removed from use by a UE. The UE is then instructed by the primary cell control logic to change to a secondary serving cell, which then becomes the new primary serving cell.

As shown in FIG. 1A, in some embodiments the BBU 120 further implements the primary cell control logic 107. The primary cell control logic 107 works in conjunction with one or both of the RRC layer 125 and the MAC layer 128 to activate, deactivate, and/or reconfigure the current serving cell relationship configuration. The primary cell control logic 107 also dynamically computes NACK rates and effective bandwidths for current primary serving cell and secondary serving cell relationships. In some embodiments, when the carrier aggregation utilization statistics indicate that the uplink NACK rate exceeds a network operator defined threshold, the primary cell control logic 107 may compare an effective bandwidth of a secondary cell with a better NACK rate than the primary serving cell. If the difference between the bandwidth of the primary serving cell and the bandwidth of the secondary serving cell is less than an operator defined bandwidth threshold the UE may be instructed to change from the current serving primary cell and change to the current secondary cell. When this occurs, the current secondary cell becomes the primary serving cell.

Figure 2:
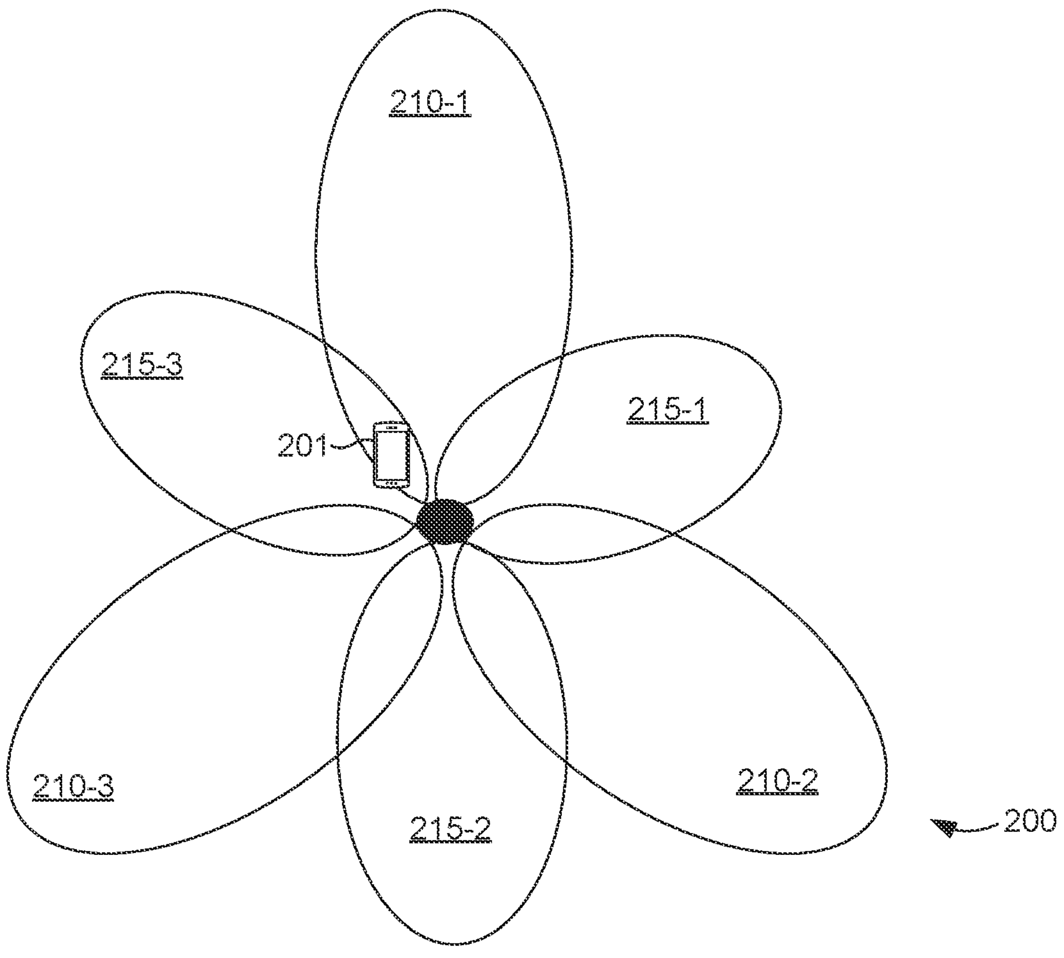
FIG. 2 is a diagram illustrating an example of primary serving cell to secondary serving cell relationship, according to an embodiment.

FIG. 2 is a diagram illustrating an example of primary serving cell to secondary serving cell relationship according to an embodiment. An example of P-cell to S-cell relationship reconfiguration according to an embodiment is illustrated at 200. In this example, cells 210-1, 210-2 and 210-3 each operate at a first carrier frequency, $f_1$. The first carrier frequency, $f_1$, defines the primary component carrier so cells 210-1, 210-2 and 210-3 each function as primary serving cells. Cells 215-1, 215-2 and 215-3 each operate at a secondary carrier frequency, $f_2$. The secondary carrier frequency, $f_2$, defines the secondary component carrier so that cells 215-1, 215-2 and 215-3 each function as secondary serving cells. For the initial P-cell to S-cell relationship in this example, the MAC layer is configured to relate primary serving cell 210-1 with secondary serving cell 215-1, primary serving cell 210-2 with secondary serving cell 215-2, and primary serving cell 210-3 with secondary serving cell 215-3.

UE 201 is located within the geographic area of primary serving cell 210-1 and is configured to use UL and DL carrier aggregation. As shown in FIG. 2, UE 201 is also located within the geographic area of secondary serving cell 215-3, which overlaps with primary serving cell 210-1. UE 201 may be served by either primary serving cell 210-1 or secondary serving cell 215-3 as directed by primary cell control logic 107. Primary serving cell 210-1 may utilize various combinations of frequencies and secondary serving cell 215-1 may utilize different combinations of frequencies, with some overlapping of frequency combinations between the primary serving cell 210-1 and the secondary serving cell 215-1.

Figure 3:
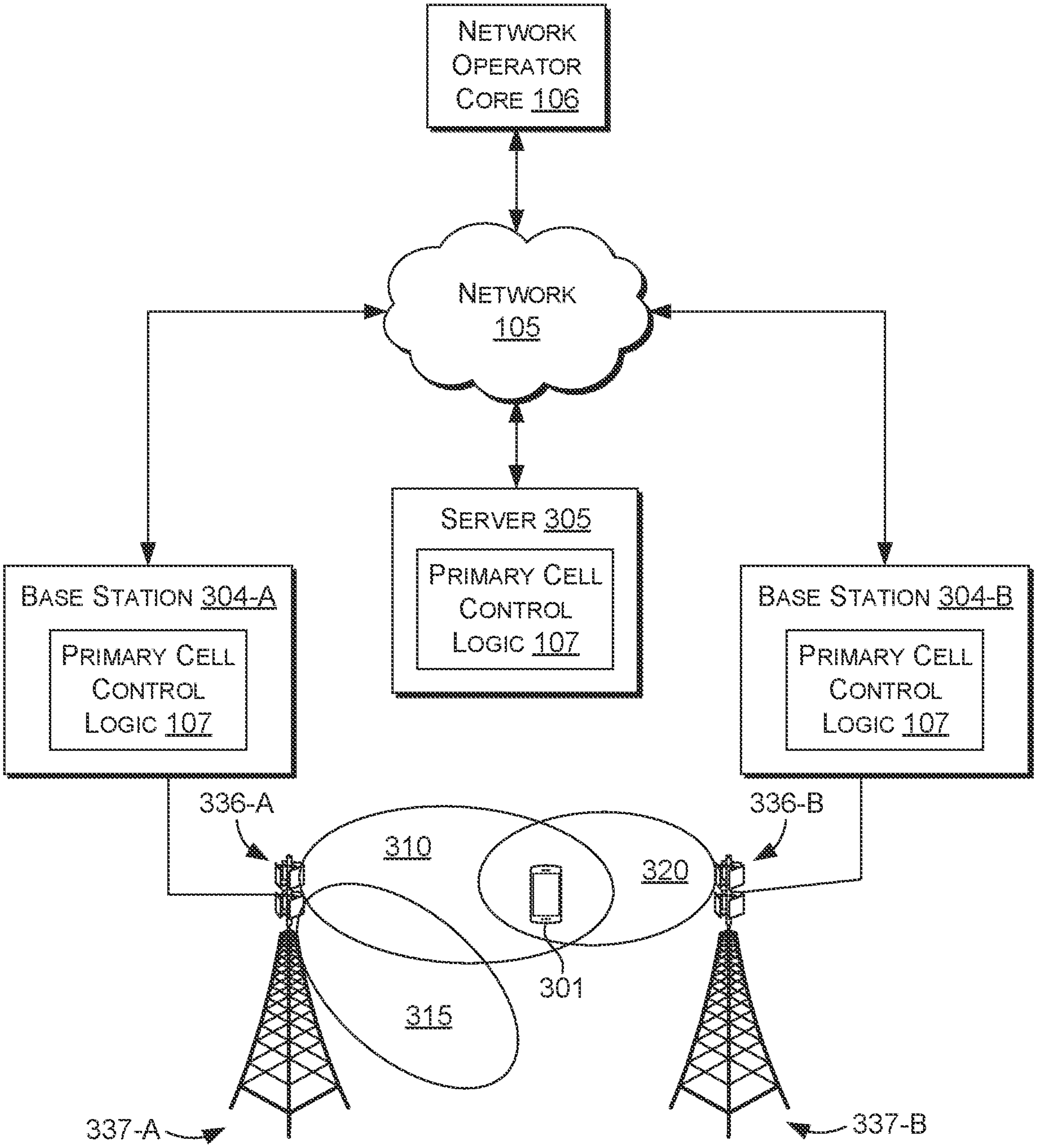
FIG. 3 is a diagram illustrating another example network environment according to an embodiment.

FIG. 3 is a diagram illustrating another example network environment according to an embodiment. An example network environment 300 (such as network environment 100 shown in FIG. 1) comprising a first base station 304-A and a second base station 304-B coupled to the network operator core 106 via network 105. In this example, base station 304-A is coupled to one or more antennas 336-A (which may be mounted to a site tower 337-A, for example). Base station 304-A forms at least one cell 310 that operates at a first carrier frequency, $f_1$, defining a primary component carrier. Cell 310 functions as a primary serving cell to at least one UE 301 within the geographic area of cell 310. Base station 304-A forms at least one other cell 315 that operates at a second carrier frequency, $f_2$. Cell 315 is configured by base station 304-A to relate to cell 310 for carrier aggregation purposes and therefore may function as a secondary serving cell for any UE that are located within the overlapping geographic regions of cell 310 and cell 315. Base station 304-B is coupled to one or more antennas 336-B (which may be mounted to a site tower 337-B, for example) and forms at least one cell 310 that operates at a third carrier frequency, $f_3$ (where the third carrier frequency, $f_3$, may be the same as, or different from, the second carrier frequency, $f_2$). For this embodiment, the primary cell control logic 107 may be implemented in the base station 304-A for the primary serving cell 310, in a separate network node or server 305 coupled to the base station 304-A via a network (such as network 105, for example), or implemented in a distributed fashion between base station 304-A and server 305. In this example, the UE 301 is within the coverage area of base station 304-A and communicates with the network operator core 106 over the primary component carrier of primary serving cell 310.

Figure 4:
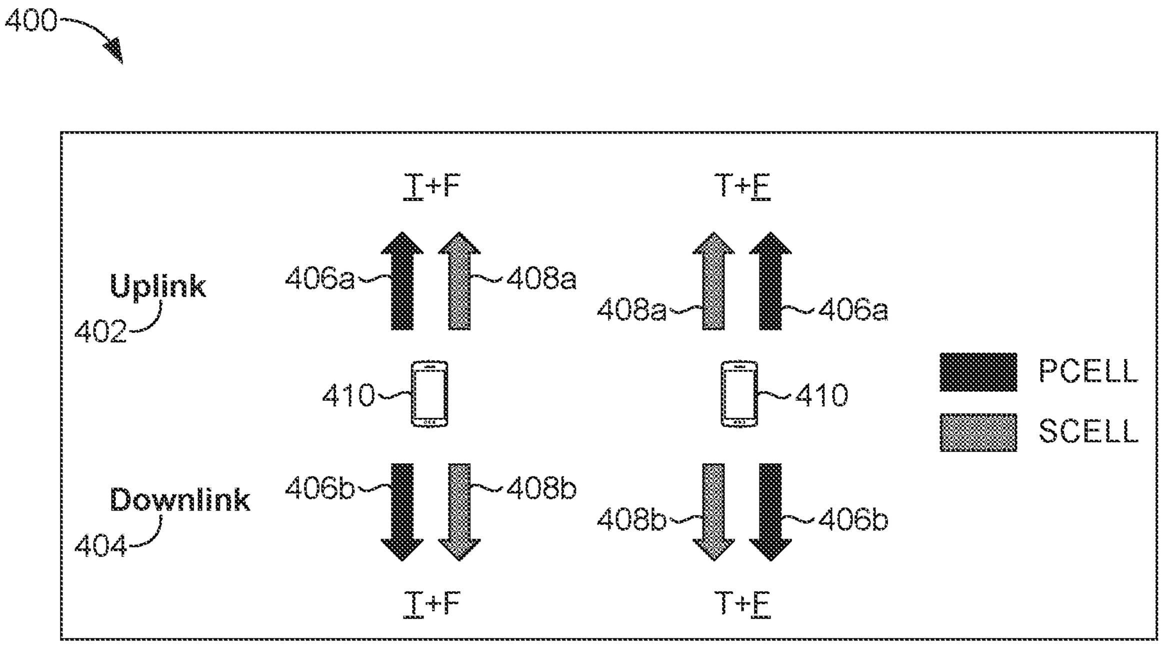
FIG. 4 is a diagram illustrating primary cell change based on uplink congestion in a network, according to an embodiment.

FIG. 4 is a flow diagram of an exemplary method for primary cell change in uplink NRCA scenarios, in which aspects of the present disclosure may be employed. A system 400 includes a UE 410 that is communicating in an uplink direction 402 and a downlink direction 404. In uplink communications the UE 410 uses an uplink carrier **406*a* on a primary cell and a downlink carrier 406*b* on the primary cell. UE 410 also has a secondary cell assigned that carries uplink and downlink communications. The secondary cell uses carrier 408*a* for uplink communications and carrier 408*b*** for downlink communications. The primary cell may use TDD for communication and the secondary cell may use FDD for communication.

The primary cell and its uplink carrier **406*a* and downlink carrier 406*b* may experience congestion on the uplink carrier. Congestion may occur because a number of users requesting uplink traffic carriers has increased or because UE 410 has moved and the signal quality is no longer sufficient to support the uplink traffic. Uplink traffic may be the limiting factor in these situations due to the power limitations of the UE 410. These conditions may result in a change of primary serving cell. In the scenario depicted in FIG. 4, the UE 410** has an active secondary cell that could be made a primary serving cell. The primary cell control logic may dynamically compare the secondary cells with the primary serving cell during uplink NRCA scenarios to enable changing the primary serving cell to the secondary cell.

The primary cell control logic compares a NACK rate of the uplink with an operator defined threshold for defined TTI slots. If the UE has an uplink NRCA configured and active, then the primary cell control logic compares the NACK rate to the secondary uplink layer(s) for the same TTI slots, if those slots are scheduled. If any secondary uplink NRCA's uplink NACK rate is better than the uplink NACK rate on the primary cell the primary cell control logic continues with comparing an effective uplink bandwidth of a better performing secondary cell bandwidth to the effective uplink bandwidth of the primary cell. If the difference between the effective uplink bandwidth on the better performing secondary cell and the effective uplink bandwidth on the primary cell is less than a predetermined threshold, the primary cell control logic instructs UE 410 to change the primary serving cell to the better performing secondary cell for both uplink and downlink.

Figure 5:
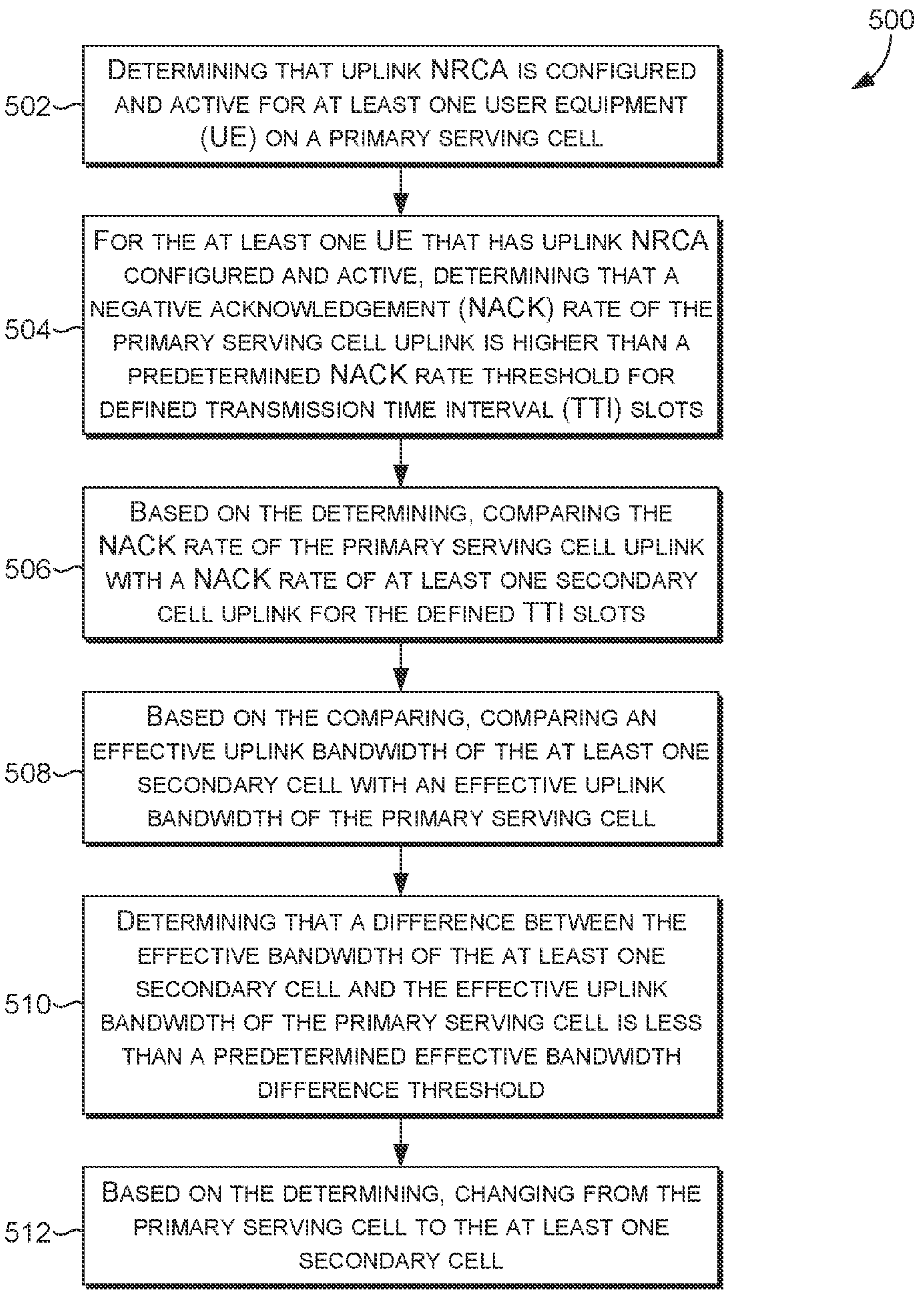
FIG. 5 is a flow diagram of an exemplary method for primary cell change in uplink NRCA scenarios, in which aspects of the present disclosure may be employed, in accordance with aspects herein.

FIG. 5 is a flow diagram of an exemplary method for primary cell change in uplink NRCA scenarios, in which aspects of the present disclosure may be employed, in accordance with aspects herein. The method 500 begins in block 502 with determining that uplink NRCA is configured and active for at least one UE on a primary serving cell. The method proceeds with block 504. In block 504 based on the determination, the method then determines that a NACK rate of the primary serving cell uplink is higher than a predetermined NACK rate threshold for defined TTI slots. The method then proceeds to block 506. Block 506 provides for comparing the NACK rate of the primary serving cell uplink with a NACK rate of at least one secondary cell uplink for the defined TTI slots.

The method continues in block 508. In block 508, based on the comparing, comparing an effective uplink bandwidth of the at least one secondary cell with an effective uplink bandwidth of the primary serving cell occurs. Then in block 510 the method continues with determining that a difference between the effective uplink bandwidth of the at least one secondary cell and the effective uplink bandwidth of the primary serving cell is less than a predetermined effective bandwidth difference threshold. The method concludes in block 512 with: based on the determining, changing from the primary serving cell to the at least one secondary cell.

The change from the primary serving cell to the at least one secondary cell may change both uplink and downlink. The frequency combination used by the primary serving cell and the at least one secondary serving cell for uplink NRCA may also be used for downlink NRCA. In addition, the frequency combination used by the primary serving bell and the at least one secondary serving cell for uplink NRCA may be a subset of frequency combinations used for downlink NRCA.

The effective bandwidth used in the determinations may be based on a percentage of uplink slots in an overall bandwidth in TDD. Furthermore, the predetermined effective bandwidth difference threshold may also be based on a percentage of uplink slots and may also be based on a capacity of the at least one secondary cell. The NACK rate may be based on a percentage of defined TTI slots.

Figure 6:
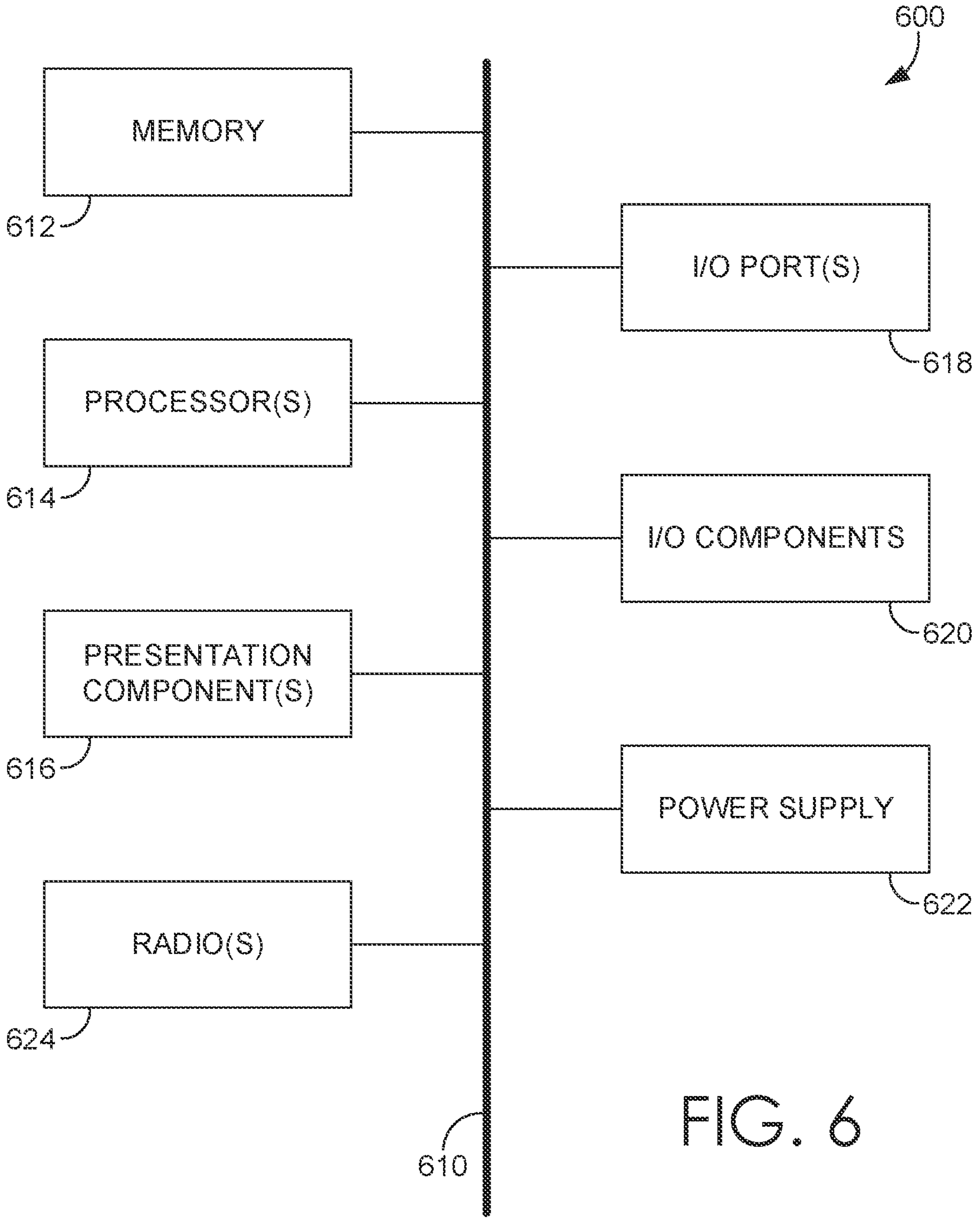
FIG. 6 depicts an exemplary computing device suitable for use in implementations of the present disclosure, in accordance with aspects herein.

FIG. 6 depicts an exemplary computing device suitable for use in implementations of the present disclosure, in accordance with aspects herein. With continued reference to FIG. 6, computing device 600 includes bus 610 that directly or indirectly couples the following devices: memory 612, one or more processors 614, one or more presentation components 616, input/output (I/O) ports 618, I/O components 620, radio(s) 624, and power supply 622. Bus 610 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 620. Also, processors, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 604 includes computer-storage media in the form of volatile and/or nonvolatile memory. Memory 604 may be removable, nonremovable, or a combination thereof. Exemplary memory includes solid-state memory, hard drives, optical-disc drives, etc. Computing device 600 includes one or more processors 614 that read data from various entities such as bus 610, memory 612, or I/O components 620. One or more presentation components 616 present data indications to a person or other device. Exemplary one or more presentation components 616 include a display device, speaker, printing component, vibrating component, etc. I/O ports 618 allow computing device 600 to be logically coupled to other devices including I/O components 620, some of which may be built into computing device 600. Illustrative I/O components 620 include a microphone, joystick, game pad, satellite dish, scanner, printer, wireless device, etc.

The radio 624 represents one or more radios that facilitate communication with a wireless telecommunications network. While a single radio 624 is shown in FIG. 6, it is contemplated that there may be more than one radio 624 coupled to the bus 610. In aspects, the radio 624 communicates with the wireless telecommunications network. It is expressly conceived that a computing device with more than one radio 624 could facilitate communication with the wireless telecommunications network via a first radio 624 and a second radio 624). Illustrative wireless telecommunications technologies include CDMA, GPRS, TDMA, GSM, and the like. The radio 616 may additionally or alternatively facilitate other types of wireless communications including Wi-Fi, WiMAX, LTE, 3G, 4G, LTE, 5G, 6G, NR, VoLTE, or other VoIP communications. As can be appreciated, in various embodiments, radio 624 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of primary cell change in an uplink new radio carrier aggregation (NRCA) scenario in a network, the method comprising:

determining that uplink NRCA is configured and active for at least one user equipment (UE) on a primary serving cell, wherein at a first time the at least one UE is in an uplink NRCA session with a first cell configured as the primary serving cell and a second cell configured as a secondary serving cell;

for the at least one UE that has uplink NRCA configured and active, determining that a negative acknowledgement (NACK) rate of the first cell uplink is higher than a predetermined NACK rate threshold for defined transmission time interval (TTI) slots;

based on the determining, comparing the NACK rate of the first cell uplink with a NACK rate of the second cell uplink for the defined TTI slots;

based on the comparing, comparing an effective uplink bandwidth of the second cell with an effective uplink bandwidth of the first cell, wherein the effective uplink bandwidth of each the first cell and the second cell is based on a percentage of uplink time division duplexing (TDD) slots in an overall bandwidth of each cell;

determining that a difference between the effective uplink bandwidth of the second cell and the effective uplink bandwidth of the primary serving cell is less than a predetermined effective bandwidth difference threshold; and based on the determining, at a second time reconfiguring the second cell as a new primary serving cell and reconfiguring the first cell as a new secondary serving cell.

2. The method of claim 1, wherein reconfiguring the second cell as the new primary serving cell and reconfiguring the first cell as the new secondary serving cell changes both uplink and downlink to the second cell.

3. The method of claim 1, wherein a frequency combination used by the primary serving cell and the secondary serving cell for uplink NRCA is also used for downlink NRCA.

4. The method of claim 1, wherein a frequency combination used by the primary serving cell and the secondary serving cell for uplink NRCA is a subset of frequency combinations used for downlink NRCA.

5. The method of claim 1, wherein the predetermined effective bandwidth difference threshold is based on a percentage of uplink slots.

6. The method of claim 1, wherein the NACK rate is based on a percentage of defined TTI slots.

7. The method of claim 1, wherein the predetermined effective bandwidth difference threshold is based on a capacity of the secondary serving cell.

8. A non-transitory computer storage media storing computer-useable instructions that, when used by one or more processors, cause the processors to:

determine that uplink NRCA is configured and active for at least one user equipment (UE) on a primary serving cell, wherein at a first time the at least one UE is in an uplink NRCA session with a first cell configured as the primary serving cell and a second cell configured as a secondary serving cell;

based on the determination, determine that a negative acknowledgement (NACK) rate of the first cell uplink is higher than a predetermined NACK rate threshold for defined transmission time interval (TTI) slots;

compare the NACK rate of the first cell uplink with a NACK rate of the second cell uplink for the defined TTI slots;

based on the comparison, compare an effective uplink bandwidth of the second cell with an effective uplink bandwidth of the first cell, wherein the effective uplink bandwidth of each the first cell and the second cell is based on a percentage of uplink time division duplexing (TDD) slots in an overall bandwidth of each cell;

determine that a difference between the effective uplink bandwidth of the second cell and the effective uplink bandwidth of the first cell is less than a predetermined effective bandwidth difference threshold; and based on the determination, at a second time reconfigure the second cell as a new primary serving cell and reconfigure the first cell as a new secondary serving cell.

9. The non-transitory computer storage media of claim 8, wherein the reconfiguration of the second cell as the new primary serving cell and the reconfiguration of the first cell as the new secondary serving cell changes both uplink and downlink to the second cell.

10. The non-transitory computer storage media of claim 8, wherein a frequency combination used by the primary serving cell and the secondary serving cell for uplink NRCA is also used for downlink NRCA.

11. The non-transitory computer storage media of claim 8, wherein a frequency combination used by the primary serving cell and the secondary serving cell for uplink NRCA is a subset of frequency combinations used for downlink NRCA.

12. The non-transitory computer storage media of claim 8, wherein the predetermined effective bandwidth difference threshold is based on a percentage of uplink slots.

* * * * *